E. B. HESS.
ESCAPEMENT MECHANISM FOR TYPE WRITING MACHINES.
APPLICATION FILED APR. 28, 1910.
1,072,118.
Patented Sept. 2, 1913.
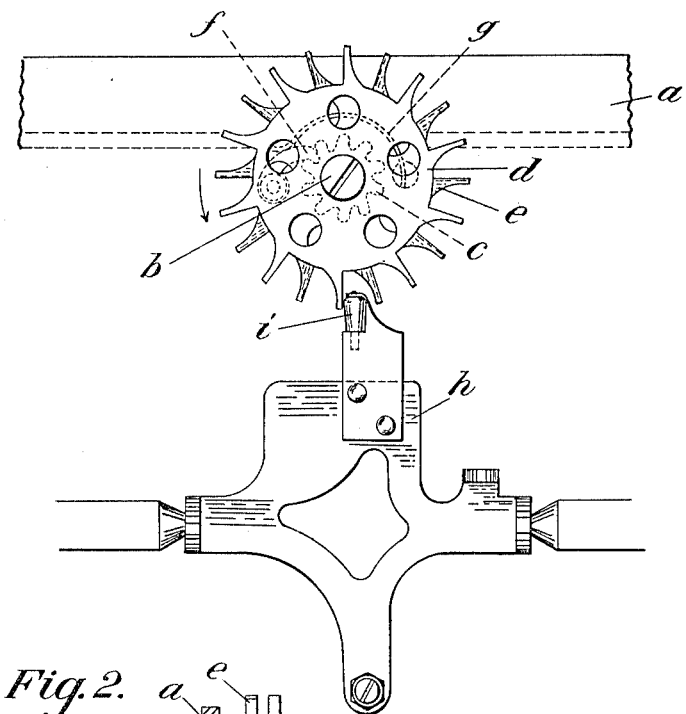
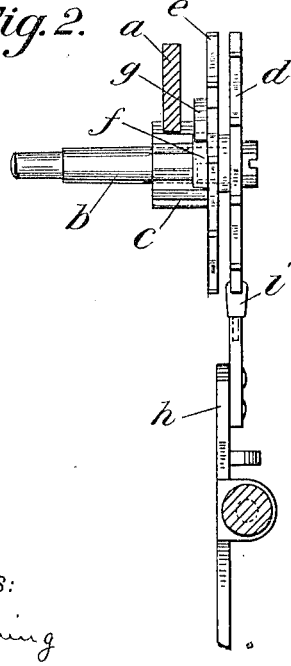

UNITED STATES PATENT OFFICE.

EDWARD B. HESS, OF NEW YORK, N. Y., ASSIGNOR TO ROYAL TYPEWRITER COMPANY, OF NEW YORK, N. Y., A CORPORATION OF NEW JERSEY.

ESCAPEMENT MECHANISM FOR TYPE-WRITING MACHINES.

1,072,118. Specification of Letters Patent. Patented Sept. 2, 1913.

Application filed April 28, 1910. Serial No. 558,124.

*To all whom it may concern:*

Be it known that I, EDWARD B. HESS, a citizen of the United States of America, residing in the borough of Manhattan, city, county, and State of New York, have invented certain Improvements in Escapement Mechanism for Type-Writing Machines.

This invention relates to wheel escapements and comprises a novel arrangement wherein two escape wheels are employed co-operating with a single movable dog. A rolling contact surface is provided to afford ready engagement and disengagement of the dog and the teeth of the wheels.

In the accompanying drawing; Figure 1 is a front elevation illustrating one form of the invention; Fig. 2, a side view with the rack in section.

$a$ indicates an ordinary rack, $b$ the escapement shaft on which is fixed the usual pinion $c$ engaging the rack. Loosely mounted on the shaft $b$ but connected so as to turn together are two escape wheels $d$, $e$, mounted to rotate together with their teeth circumferentially spaced apart substantially as indicated. On the rear face of the rear wheel $e$ is the usual pivoted dog $f$ upon which bears a spring $g$ also fastened to the rear face of that wheel and tending to carry the pawl into engagement with the pinion $c$. The escapement plate or rocker $h$ has a single dog, shown as a roller $i$ mounted in the end of the dog plate in the general manner disclosed in my Patent No. 827,976 dated August 7, 1908. This roller, however, is of larger diameter adjacent its upper end than at its lower end and is rounded at its upper end so as to have the appearance somewhat of a pear-shaped figure. The dog in passing from a tooth of wheel $d$ comes into the path of the approaching tooth on the rear wheel $e$. In the operation of this device as illustrated in Figs. 1 and 2, the single rigid roller dog passes from a tooth on one wheel to a tooth on the adjacent wheel and then back again to the next tooth on the first wheel in the operation of a single letter space. It is a form of drop device comprising two rigidly escape wheels and a single rigid roller dog.

The cone-shaped, or rather pear-shaped, roller dog of the escapement rocker, has, owing to the rounded upper edge or bulbous shape at the upper end, the advantage that whatever may be the drop or whatever may be the angular relation of the teeth of the wheel to the dog, the sharp corners of the teeth cannot impinge upon the sides of the roller dog. There is therefore no cutting of the roller. There is a minimum of wear and increased certainty of operation accompanied by longer life of the parts.

The construction shown applies to what is known as a regulation adjustment. It may readily be converted into the relation required for a speed dog.

The invention herein claimed is not limited to the use of a pair of escape wheels, but is of general application to escapement devices.

I claim:

1. An escapement mechanism for writing machines comprising a toothed escapement-wheel and a movable detent having a roller with tapered sides and of greatest diameter at its outer end adjacent the escapement wheel and upon the periphery of which roller at its greatest diameter the working surfaces of the teeth of the wheel bear.

2. An escapement mechanism for writing machines comprising a toothed escapement wheel and a movable detent, having a roller of unequal diameter throughout its length and upon the periphery of such roller at its greatest diameter the working surfaces of the teeth of the wheel bear.

In testimony whereof, I have hereunto subscribed my name.

EDWARD B. HESS.

Witnesses:
F. C. MYERS,
A. J. SHERIDAN.